United States Patent
Scothern

(10) Patent No.: US 10,850,857 B2
(45) Date of Patent: Dec. 1, 2020

(54) ICE DETECTION

(71) Applicant: ROLLS-ROYCE plc, London (GB)

(72) Inventor: David P. Scothern, Derby (GB)

(73) Assignee: ROLLS-ROYCE plc, London (GB)

( * ) Notice: Subject to any disclaimer, the term of this patent is extended or adjusted under 35 U.S.C. 154(b) by 282 days.

(21) Appl. No.: 16/038,263

(22) Filed: Jul. 18, 2018

(65) Prior Publication Data
US 2019/0023406 A1 Jan. 24, 2019

(30) Foreign Application Priority Data

Jul. 20, 2017 (GB) .................................. 1711689.8

(51) Int. Cl.
| | |
|---|---|
| *B64D 15/20* | (2006.01) |
| *F01D 25/02* | (2006.01) |
| *F02C 7/047* | (2006.01) |
| *F01D 21/00* | (2006.01) |

(52) U.S. Cl.
CPC ............ *B64D 15/20* (2013.01); *F01D 21/003* (2013.01); *F01D 25/02* (2013.01); *F02C 7/047* (2013.01); *F05D 2240/121* (2013.01); *F05D 2240/122* (2013.01); *F05D 2240/123* (2013.01); *F05D 2240/124* (2013.01); *F05D 2270/303* (2013.01)

(58) Field of Classification Search
None
See application file for complete search history.

(56) References Cited

U.S. PATENT DOCUMENTS

| | | | |
|---|---|---|---|
| 4,210,021 A * | 7/1980 | Vykhodtsev | ........... B64D 15/20 340/580 |
| 4,333,004 A | 6/1982 | Forgue et al. | |
| 4,379,227 A | 4/1983 | Kovacs | |
| 5,265,414 A | 11/1993 | Mouton | |
| 5,471,831 A | 12/1995 | Rowe | |
| 6,347,767 B1 | 2/2002 | Holmen | |
| 6,644,009 B2 | 11/2003 | Myers, Jr. | |
| 7,895,818 B2 | 3/2011 | Snell et al. | |
| 8,515,711 B2 * | 8/2013 | Mitchell | ............... F01D 21/003 702/183 |
| 9,133,773 B2 | 9/2015 | Gould et al. | |
| 9,201,031 B2 | 12/2015 | Lilie et al. | |

(Continued)

FOREIGN PATENT DOCUMENTS

| | | |
|---|---|---|
| EP | 1422137 | 5/2004 |
| EP | 3 431 720 A1 | 1/2019 |
| GB | 2023291 | 12/1979 |

OTHER PUBLICATIONS

Great Britain Search Report dated Nov. 29, 2017, issued in GB Patent Application No. 1711689.8.

(Continued)

*Primary Examiner* — Kenneth J Hansen
*Assistant Examiner* — Jason Fountain
(74) *Attorney, Agent, or Firm* — Oliff PLC

(57) ABSTRACT

The present disclosure concerns the detection of ice within a system. More specifically, but not exclusively, the disclosure concerns the detection of ice accretion within a gas turbine engine. The apparatus and method relies on heating a first region (38) of a component (44) and comparing the measured temperature of the first region (38) with a second temperature value, possibly measured at a distinct second region (40) of the component (44).

18 Claims, 5 Drawing Sheets

(56) References Cited

U.S. PATENT DOCUMENTS

| | | | |
|---|---|---|---|
| 2004/0095984 A1* | 5/2004 | Severson | B64D 15/20 374/16 |
| 2005/0268710 A1 | 12/2005 | Rasmussen et al. | |
| 2008/0167764 A1 | 7/2008 | Flemming | |
| 2009/0242703 A1 | 10/2009 | Alexander et al. | |
| 2013/0158831 A1 | 6/2013 | Djelassi et al. | |
| 2014/0007654 A1 | 1/2014 | Lilie et al. | |

OTHER PUBLICATIONS

Feb. 26, 2020 Extended Search Report issued in European Patent Application No. 19208761.7.
Jun. 5, 2019 Search Report issued in British Patent Application No. GB1820301.8.
U.S. Appl. No. 16/683,819, filed Nov. 14, 2019 in the name of Jones et al.

* cited by examiner

ICE DETECTION

CROSS-REFERENCE TO RELATED APPLICATIONS

This application is based upon and claims the benefit of priority from British Patent Application No. GB 1711689.8, filed on 20 Jul. 2017, the entire contents of which are incorporated by reference.

BACKGROUND

Technical Field

The present disclosure concerns the detection of ice within a system. More specifically, but not exclusively, the disclosure concerns the detection of ice accretion within a gas turbine engine.

Description of the Related Art

Ice accretion, i.e. the build-up of ice on surfaces, is a problem that can arise when aircraft are required to operate in conditions where the atmosphere has a high concentration of ice. The build-up of ice in a gas turbine engines can block or restrict airflow, leading to a loss in engine power and, if dislodged, can cause damage to engine components as it passes through an engine.

The atmospheric conditions that give rise to ice accretion are typically found at relatively low altitudes. However, certain atmospheric phenomena, such as thunderstorm activity, can result in ice crystals being present in the air at higher altitudes causing a risk of so-called 'ice crystal icing'.

A common approach to protecting against ice accretion relies on proactively changing the engine's operating point when it is determined that ice accretion is possible. As a further safeguard, compressor rotor blades are made more robust to account for the potential threat.

Altering the engine's operating point (e.g. by raising idle thrust levels in order to increase temperatures in the compressors, or by opening handling bleed valves to eject ice crystals) represents a compromising of the engine's operating efficiency and consequent degradation of fuel burn and increase in operating costs. As such, these steps would preferably only be initiated after detecting environmental conditions likely to contain ice.

However, detecting these conditions with any certainty can be difficult. In particular, high altitude ice crystals cannot be detected with currently available ice detection systems, so current aircraft do not have means to detect ice crystal ice in the atmosphere. The crystals can be very small, and are often present in low concentrations above powerful storm systems but cannot currently be detected directly using weather radar.

The engine's operating point is therefore often altered pre-emptively, to avoid the risk of ice crystal icing even in atmospheric conditions that are not normally associated with ice accretion. Crystal icing is a relatively rare phenomenon, and therefore these precautionary measures could largely be eliminated if a reliable means of detection were available. For example, in U.S. Pat. No. 9,201,031, a system is disclosed for detecting the presence of ice crystals in a cloud comprising two thin walled semicylinder-shaped sensors, one having a concave inner surface and oriented longitudinally in a leading edge of an airfoil and the other having a convex outer surface being oriented longitudinally in the leading edge of the airfoil so that cloud water flows towards and into contact with the convex outer surface; a temperature controlling arrangement for heating the two sensors and maintaining them at a substantially constant temperature; and a comparison arrangement for finding a difference between (i) a power to maintain the temperature of the first sensor at its substantially constant temperature (ii) a power to maintain the temperature of the second sensor at its substantially constant temperature; and comparing the difference of the powers to a threshold value for evidencing the presence or predetermined amount of ice in the cloud water.

SUMMARY

According to a first aspect there is provided apparatus for detecting ice accretion as defined in the appended claim 1. Also provided is apparatus for detecting ice accretion as defined in the appended claim 12. Further aspects and features may be provided as recited in the associated dependent claims.

The apparatus for detecting ice accretion on a component, wherein the component is comprised within a gas turbine engine, includes at least a first heater for applying heat to a first region of the component, a first temperature sensor for determining the temperature of the first region, and a comparator for comparing the temperature determined by the first temperature sensor with a second temperature value. The apparatus may further comprise a second heater for applying heat to a second region of the component and a second temperature sensor for determining the temperature of the second region, wherein the second temperature sensor provides the second temperature value. Either of both of the first temperature sensor or second temperature sensor may be positioned aft of a leading edge of the component.

In the event of ice build-up on any part/region of a component, the heat energy applied will be largely absorbed in melting the ice rather than in raising the temperature of the component. The measured temperature will thus tend to be driven close to zero degrees Celsius. Comparing the measured temperature with a reference value, for example a temperature limit in the range of zero to five degrees Celsius such as one or two degrees Celsius, can provide an indication of ice accretion on a region of the component.

The comparison may be repeated, such that a rate of heating can be compared to a set of reference temperature values forming a heating profile. If the determined temperature is seen to be moving or increasing very slowly, or more slowly than expected, then there is an indication that it is being lagged or buffered by the presence ice.

The reliable detection of ice helps to avoid the need for unnecessary changes in engine operating point, thus increasing efficiency. In addition, compressor rotor blades and other engine components need not be made so robust if there is increased confidence that ice accretion can be avoided, so material and manufacturing costs can also be reduced.

Providing two temperature sensors, each paired with an electrical heating element, avoids the need for a set reference temperature and allows the apparatus to adapt to different environmental conditions and/or ambient temperatures. For example, where the apparatus is located in a gas compressor stream, the two temperature readings will show a stable relationship with compressor gas stream temperature during normal operation. Continued monitoring the temperature difference between the two sensors will provide an indication of when the temperature difference departs from the expected relationship. This information can then be interpreted, potentially with confirmation from other engine sensors, as indicating the accretion of ice on a component.

Again, repeated measurements and comparisons may be performed to allow a comparison of heating profiles.

The apparatus may be used for ice accretion on a component of a gas turbine engine. The second region may, for example, comprise a trailing edge of the component or a suction surface of the component. The first region may, for example, comprise a leading edge of the component or a pressure surface of the component.

The or each heater may be located on or in the component, for example mounted on the pressure surface, suction surface, leading edge or trailing edge of a vane or strut in a region of interest. For example, the or each heater may be located on a so-called 'intercase strut', i.e. a strut associated with a compressor intermediate casing that sits between an intermediate pressure compressor and a high pressure compressor.

The or each heater may comprise an electrical heating element.

The first temperature sensor and first heating element may be provided by a first common component. The first common component may be an electrically conductive member. The first common component may be configured so that upon application of a current, an electrical property of the first common component may be monitored to determine a temperature.

The second temperature sensor and second heating element may be provided by a second common component. The second common component may be an electrically conductive member. The second common component may be configured so that upon application of a current, an electrical property of the second common component may be monitored to determine a temperature.

The electrical property may be resistance. The electrical property may be impedance.

A vane or a strut for use in a gas turbine engine, such as an intercase strut as described above, may comprise apparatus as previously described, and a gas turbine engine may comprise such a vane or strut.

The described method of detecting ice accretion on a component comprises at least the steps of applying heat to a first region of the component during use of the component, monitoring the temperature of the first region during use and comparing the monitored temperature of the first region with a second temperature value. Ice accretion is detected based on the comparison of the monitored temperature of the first region with the second temperature value during use of the component.

The method may further comprise the steps of applying heat to a second region of the component during use of the component and monitoring the temperature of the second region during use. Ice accretion may be detected based on a comparison of the monitored temperatures of the first and second regions.

Alternatively, ice accretion may be detected based on a comparison of the monitored temperatures of the first region with a reference temperature close to zero degrees Celsius, for example in the range of zero to five degrees Celsius such as one or two degrees Celsius.

Heat may be applied directly to the first region of the component and/or to the second region of the component.

The second region may comprise a trailing edge or a suction surface of a component, for example a component in a gas turbine engine.

The first region may comprise a leading edge or a pressure surface of a component, for example a component in a gas turbine engine.

Heat may be applied using an electrical heating element.

Heat may be applied to the first and/or second region constantly during use of the component.

Alternatively, the heat may be applied to heat the first and/or second region to an equilibrium temperature, and the comparing step may be performed only once the first and/or second region has reached said equilibrium temperature.

Alternatively, the rate of temperature increase of a region may be monitored as the heat is applied to provide a measured heating profile which is compared to a reference heating profile.

In either case the heat need not be applied to the component constantly. Heat may be applied only once, periodically, at irregular intervals or on demand, for example when the engine operating point changes, or based on some other trigger. The heat may be applied for a predetermined amount of time or until a set temperature or engine operating point is reached, or the application of heat may be entirely controlled by a user.

Accordingly, apparatus for detecting ice accretion on a component, wherein the component is comprised within a gas turbine engine, may be provided comprising a first heater, a first temperature sensor, and a controller, wherein the controller is configured to read computer readable instructions to execute the steps of applying heat from the heater to a first region of a component during use of the component monitoring the temperature of the first region with the first temperature sensor during use and comparing the monitored temperature of the first region with a second temperature value or profile, wherein ice accretion is detected based on the comparison of the monitored temperature of the first region with the second temperature value or profile during use of the component, and wherein either of both of the first temperature sensor or second temperature sensor are positioned aft of a leading edge of the component.

Heat may be applied directly to the first region of the component.

A second heater and a second temperature sensor may be provided, wherein the controller is configured to read computer readable instructions to execute the additional steps of applying heat from the second heater to a second region of the component during use of the component and monitoring the temperature of the second region with the first temperature sensor during use, wherein ice accretion is detected based on a comparison of the monitored temperatures of the first and second regions.

Heat may be applied directly to the second region of the component.

The second region may comprise a trailing edge of a component in a gas turbine engine.

The second region may comprise a suction surface of a component in a gas turbine engine.

The first region may comprise a leading edge of a component in a gas turbine engine.

The first region may comprise a pressure surface of a component in a gas turbine engine.

The heater may comprise an electrical heating element.

The first temperature sensor and first heater may be provided by a first common component. The first common component may be an electrically conductive member. The first common component may be configured so that upon application of a current, an electrical property of the first common component may be monitored to determine a temperature.

The second temperature sensor and second heater may be provided by a second common component. The second common component may be an electrically conductive member. The second common component may be configured so that upon application of a current, an electrical property of the second common component may be monitored to determine a temperature.

The electrical property may be resistance. The electrical property may be impedance.

The controller may be configured to read computer readable instructions to control the first and/or second heater to apply heat constantly during use of the component.

The controller may be configured to read computer readable instructions to control the first and/or second heater to apply heat to heat a region to an equilibrium temperature, and the comparing step may be performed only once said region has reached said equilibrium temperature.

The apparatus may further comprise a memory, and the controller may be configured to read computer readable instructions to execute the additional steps of monitoring the rate of temperature increase of the first region as the heat is applied to provide a measured heating profile, storing the measured heating profile in the memory, and comparing the measured heating profile, in the comparing step, to a reference temperature profile.

The controller may comprise a comparator.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
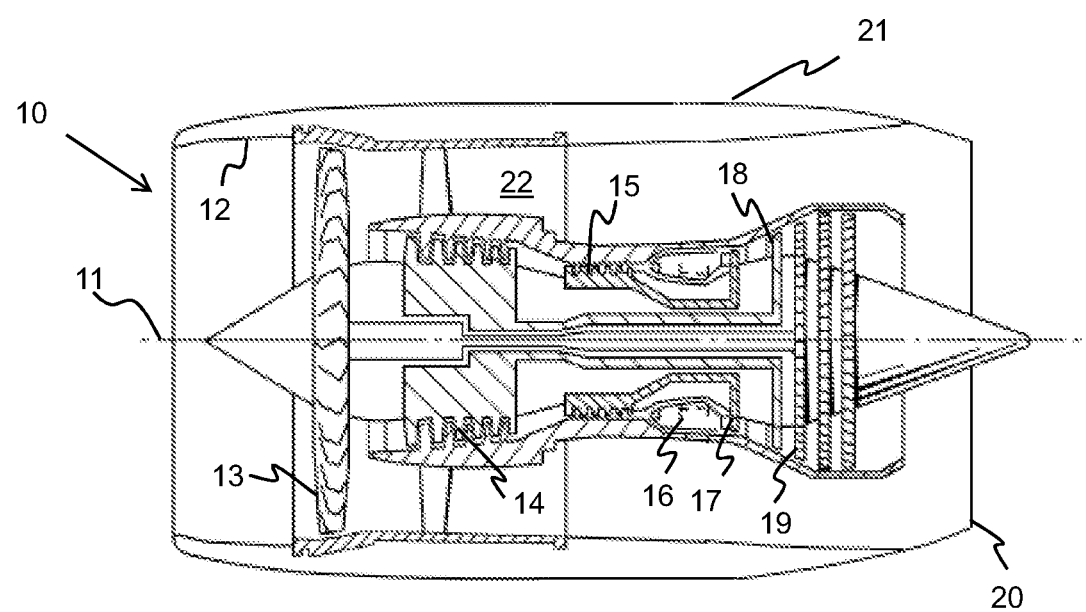
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
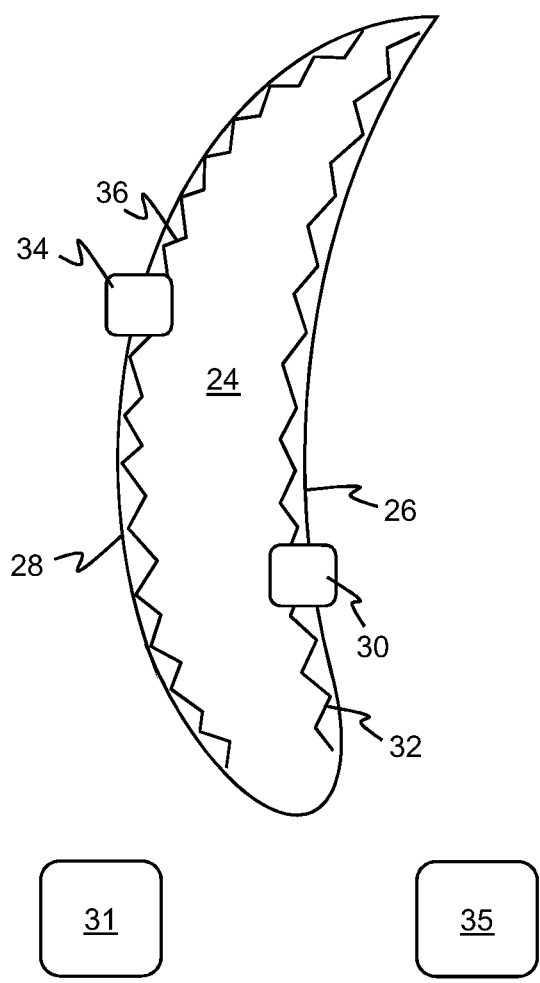
FIG. 2 is a schematic cross-sectional view of a vane illustrating a first embodiment of the present invention.

FIG. 2 shows a schematic cross-sectional view of a vane 24 from a region of interest within the compressors of a gas turbine engine 10 as illustrated in FIG. 1. The vane 24 has a pressure surface 26 and a suction surface 28. A first temperature sensor 30 is provided on the pressure surface 26 of the vane 24, along with a first electrical heating element 32. A second temperature sensor 34 and a second electrical heater element 36 are provided on the suction surface 28. Each temperature sensor 30,34 is heated by its adjacent electrical heater element 32,36. The spacing between the distinct regions being considered, namely the pressure surface 26 and the suction surface 28, helps to avoid the heating of one region from directly influencing the temperature of the other.

The two temperature sensors 30,34 provide temperature information in the region of interest. During normal operation, in dry air, the temperatures detected by the temperature sensors 30,34 will show a stable relationship with compressor gas stream temperature, so will track compressor temperatures in a predictable manner.

If ice begins to accrete on the vane 24, it will preferentially build up on one particular surface. The melting of the ice build-up will act as a buffer, absorbing the heat from the heating element 32,36 associated with that surface and driving the temperature on that surface close to zero degrees Celsius. The difference in measured temperature between the two temperature sensors 30,34 can then be interpreted, potentially with confirmation from other engine sensors, as indicating the accretion of ice within the engine.

For example, if ice accretion occurred on the pressure surface 26 of the vane 24, the measured temperature at the first temperature sensor 30 would approach zero degrees Celsius. The resulting temperature difference between the surface temperatures of the pressure surface 26 and the suction surface 28, measured by the first and second temperature sensors 30,34, will indicate ice accretion on the suction surface 26.

A controller 31 and a memory 35 are also shown in FIG. 2. The controller may comprise a comparator to perform the comparison step between the temperature measured by one or other temperature sensor 30,34 and the reference value, which can be stored in the memory 35, or directly between the readings of the first and second temperature sensors 30,34. The memory 35 may also record measured temperature values over time to create a measured temperature profile for comparison with a reference profile.

Controller 31 can control various aspects of the apparatus, including one or more of heater operation, temperature measurement intervals, and data recording and comparison. In use, computer readable instructions may be provided to the controller 31, which may form part of a standard engine controller, for example a full authority digital engine/electronics control (FADEC), or may be provided as a stand-alone unit.

The ability to detect and respond to ice accretion will eliminate a fuel burn penalty currently caused by the need to defend engines in all conditions in which crystal icing could occur.

Instead of mounting on the pressure and suction surfaces, temperature sensors could be positioned fore and aft on a surface, on the basis that accretion is likely to be initiated at the front of the vane and grow rearwards. This would be useful for detection when fitted to gas path features that do not do aerodynamic work, e.g. struts such as intercase struts.

Figure 3:
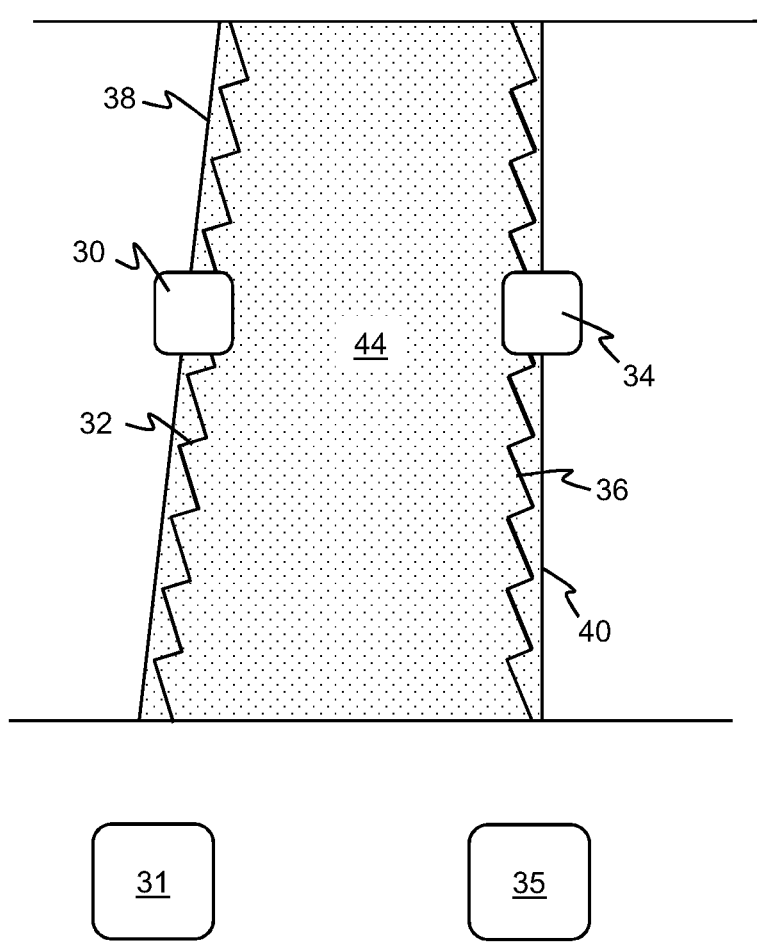
FIG. 3 is a schematic view of an intercase strut illustrating an alternative embodiment of the present invention.

FIG. 3 shows a schematic view of an intercase strut 44 from the intermediate pressure part of a gas turbine engine 10. In FIG. 3, the first temperature sensor 30 and first electrical heating element 32 are provided on a leading edge 38 of the intercase strut 44, with the second temperature sensor 34 and second electrical heater element 36 provided on the trailing edge 30. As before, a measured temperature difference between the first and second temperature sensors 30,34 is indicative of ice accretion, for example at the leading edge 38 of the intercase strut 44. Again, a controller 31 and memory 35, as previously described, are provided in the system of FIG. 3.

Figure 4:
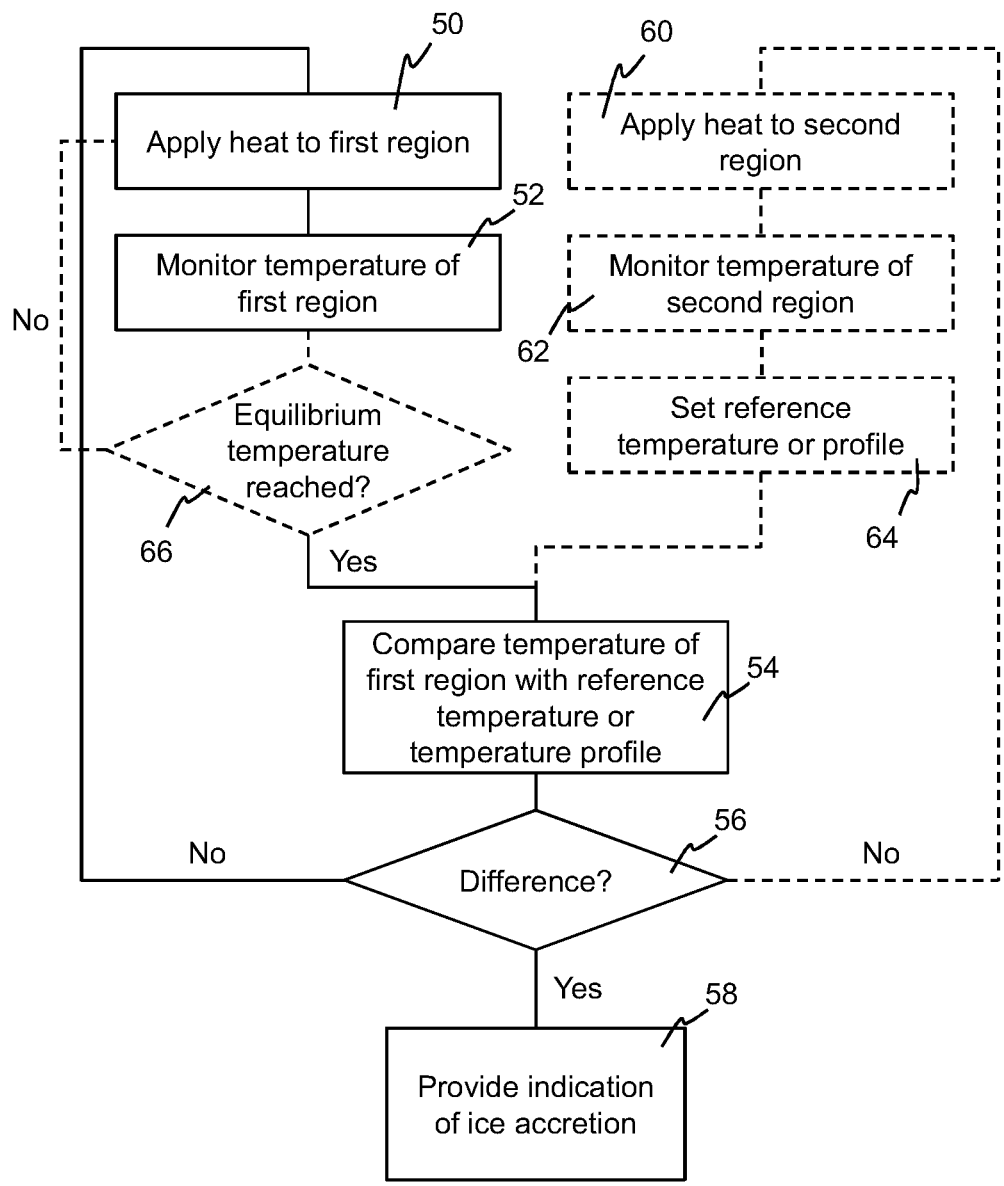
FIG. 4 is a flow chart illustrating a method according to the present invention; and, FIG. 5 is a schematic view of an intercase strut illustrating an alternative embodiment of the present invention.

A method of detecting ice accretion on a component is illustrated in FIG. 4. In a first step 50, heat is applied to a first region of a component during use. The temperature of the first region is monitored during use at 52, and compared with a second, reference, temperature value or temperature profile at step 54. If the comparison 54 shows no difference, then the heating, monitoring and comparing steps 50,52,54 are repeated until interrupted by a user, or stopped based on a predetermined time or temperature threshold. If the comparison 54 shows a difference at step 56, then an indication of ice accretion is provided at step 58.

ice accretion can be detected based simply on a comparison, at step 54, of the monitored temperatures of the first region 52 with a reference temperature close to zero degrees Celsius, for example in the range of zero to five degrees Celsius such as one or two degrees Celsius.

Alternatively, heat may also be applied to second region of the component, during use, at step 60, and the temperature of the second region monitored during use at 62 to provide the reference temperature value or update a reference temperature profile 64 for use in the comparison step 54.

Heat can be applied directly to the first region of the component at step 50 and/or to the second region of the component at step 60, for example using an electrical heating element.

Heat may be applied 50,60 to the first and/or second region constantly during use of the component, or may be applied 50,60 to heat the first and/or second region to an equilibrium temperature. In this case, the method includes the step of checking whether an equilibrium temperature has been reached, at step 66, and the comparing step 54 is performed only once the first and/or second region has reached said equilibrium temperature.

As a further alternative, the rate of temperature increase of a region may be monitored as the heat is applied, by monitoring the temperature of the first region over time at step 52. This provides a measured heating profile which is compared to a reference heating/temperature profile at step 54.

Heat may be applied only once, periodically, at irregular intervals or on demand, for example when the engine operating point changes, or based on some other trigger. The heat may be applied for a predetermined amount of time or until a set temperature or engine operating point is reached, or the application of heat may be entirely controlled by a user.

Figure 5:
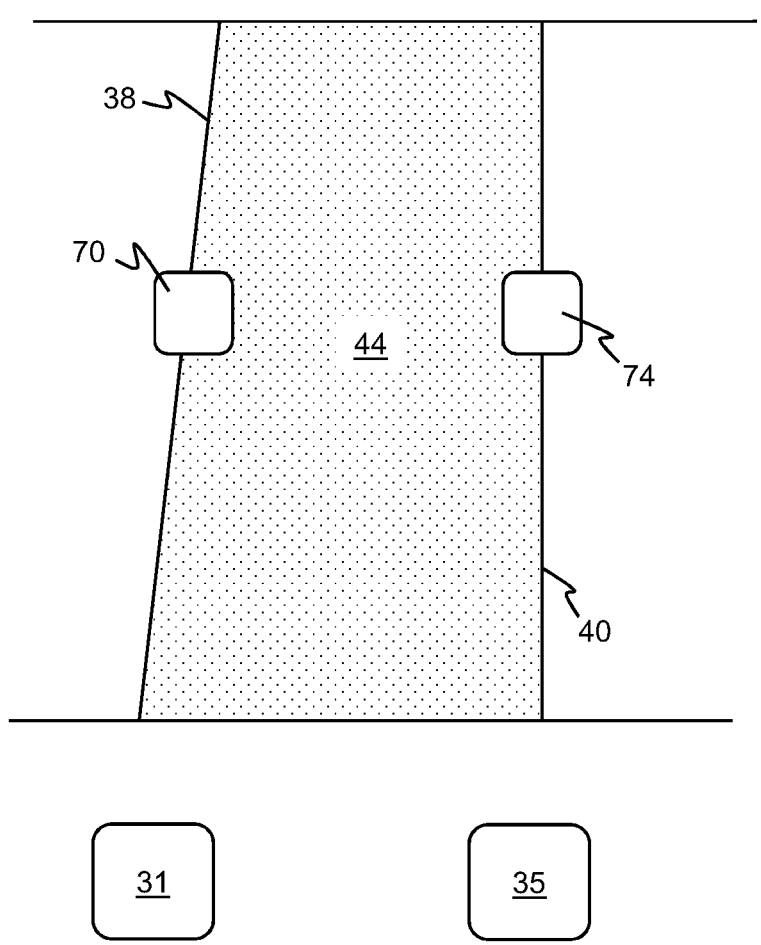

FIG. 5 shows a schematic view of a further example of an intercase strut 44 from the intermediate pressure part of a gas turbine engine 10. In FIG. 5, the first temperature sensor and first electrical heating element are provided in a common component 70 on a leading edge 38 of the intercase strut 44. Furthermore, the second temperature sensor and second electrical heater element are provided in a common component 74 on the trailing edge 30 of the intercase strut 44. Either or both of the first common component 70 and the second common component 74 may be an electrically conductive member.

The first common component 70 may be configured so that upon application of a current, an electrical property of the first common component 70 may be monitored to determine a temperature. The second common component 74 may be configured so that upon application of a current, an electrical property of the second common component 74 may be monitored to determine a temperature. The electrical property may be resistance. In further examples, the arrangement may be configured to determine the impedance of either or both of the first common component 70 and the second common component 74. Thus, the electrical property may be impedance.

The temperature of either or both of the first common component 70 and the second common component 74 may monitored or determined in this way in an equivalent manner to that described in relation to FIG. 2. It will also be appreciated that the arrangement may be equally applied to any further structure described herein, including the vane 24 of FIG. 2.

According to an example, a hot wire could be used, in place of a temperature sensor and a heating element, with a current being passed through the wire and its resistance being measured. It will be appreciated that a hot wire is a sensor. The hot wire sensor may be made from a length of resistance wire. Furthermore, the hot wire may be, for example, circular in section. Since resistance is proportional to temperature, this would also be effective in showing the presence or absence of ice accretion. Thus, a measured temperature difference between the first and second temperature sensors 70,74 is indicative of ice accretion, for example at the leading edge 38 of the intercase strut 44. Again, a controller 31 and memory 35, as previously described, are provided in the systems of FIG. 3 and FIG. 5.

It will be understood that the invention is not limited to the embodiments above-described and various modifications and improvements can be made without departing from the concepts described herein.

Except where mutually exclusive, any of the features may be employed separately or in combination with any other features and the disclosure extends to and includes all combinations and sub-combinations of one or more features described herein.

The invention claimed is:

1. An apparatus for detecting ice accretion on a component, wherein the component is located within a gas turbine engine, the apparatus including a first heater for applying heat to a first region of the component and a first temperature sensor for determining the temperature of the first region, and a comparator for comparing the temperature determined by the first temperature sensor with a second temperature value, the apparatus further comprising a second heater for applying heat to a second region of the component and a second temperature sensor for determining the temperature of the second region, wherein the second temperature sensor provides the second temperature value, and
    wherein either of the first temperature sensor or the second temperature sensor are positioned aft of a leading edge of the component,
    the first region comprises a pressure surface of the component, and the second region comprises a suction surface of the component, and
    the first temperature sensor is disposed on the pressure surface, and the second temperature sensor is disposed on the suction surface.

2. The apparatus according to claim 1, wherein the second region comprises a trailing edge of the component.

3. The apparatus according to claim 1, for wherein the first region comprises the leading edge of the component.

4. The apparatus according to claim 1, wherein each heater is located on or in the component.

5. The apparatus according to claim 1, wherein each heater comprises an electrical heating element.

6. The apparatus according to claim 1, wherein the first temperature sensor and first heating element are provided by a first common component.

7. The apparatus according to claim 6, wherein the first common component is an electrically conductive member, the first common component being configured so that upon application of a current, an electrical property of the first common component is monitored to determine a temperature.

8. The apparatus according to claim 1, wherein the second temperature sensor and second heating element are provided by a second common component.

9. The apparatus according to claim 8, wherein the second common component is an electrically conductive member, the second common component being configured so that upon application of a current, an electrical property of the second common component is monitored to determine a temperature.

10. An apparatus for detecting ice accretion on a component, wherein the component is located within a gas turbine engine, the apparatus comprising a first heater, a first temperature sensor disposed in a first region of the component, a second temperature sensor disposed in a second region of the component, and a controller, wherein the controller is configured to read computer readable instructions to execute the steps of:
    applying heat from the first heater to the first region of the component during use of the component;
    monitoring a first temperature of the first region with the first temperature sensor during use; and
    comparing the monitored first temperature of the first region with a second temperature of the second region obtained from the second temperature sensor;
    wherein the first region comprises a pressure surface of the component, and the second region comprises a suction surface of the component,
    the first temperature sensor is disposed on the pressure surface, and the second temperature sensor is disposed on the suction surface,
    either of the first temperature sensor or the second temperature sensor are positioned aft of a leading edge of the component, and
    ice accretion is detected based on the comparison of the monitored first temperature of the first region with the second temperature value during use of the component.

11. The apparatus according to claim 10, wherein the apparatus further comprises a second heater, wherein the controller is configured to read computer readable instructions to execute additional steps of:
    applying heat from the second heater to the second region of the component during use of the component; and
    monitoring the second temperature of the second region with the second temperature sensor during use;
    wherein ice accretion is detected based on a comparison of the first and second monitored temperatures of the first and second regions.

12. The apparatus according to claim 11, wherein the second temperature sensor and second heater are provided by a second common component.

13. The apparatus according to claim 12, wherein the second common component is an electrically conductive member, the second common component being configured so that upon application of a current, an electrical property of the second common component is monitored to determine the second temperature.

14. The apparatus according to claim 11, wherein the controller is configured to read computer readable instructions to control the first and/or second heater to apply heat constantly during use of the component.

15. The apparatus according to claim 11, wherein the controller is configured to read computer readable instructions to control the first and/or second heater to apply heat to heat a region to an equilibrium temperature, and wherein the comparing step is performed only once said region has reached said equilibrium temperature.

16. The apparatus according to claim 10, wherein the first temperature sensor and first heater are provided by a first common component.

17. The apparatus according to claim 16, wherein the first common component is an electrically conductive member, the first common component being configured so that upon application of a current, an electrical property of the first common component is monitored to determine the first temperature.

18. The apparatus according to claim 10, further comprising a memory, and wherein the controller is configured to read computer readable instructions to execute additional steps of:
    monitoring a rate of temperature increase of the first region as the heat is applied to provide a measured heating profile;
    storing the measured heating profile in the memory; and
    comparing the measured heating profile, in the comparing step, to a reference temperature profile.

\* \* \* \* \*